Feb. 7, 1956  M. W. STAUDT, SR  2,733,559
WORK HOLDING JIG
Filed July 31, 1953
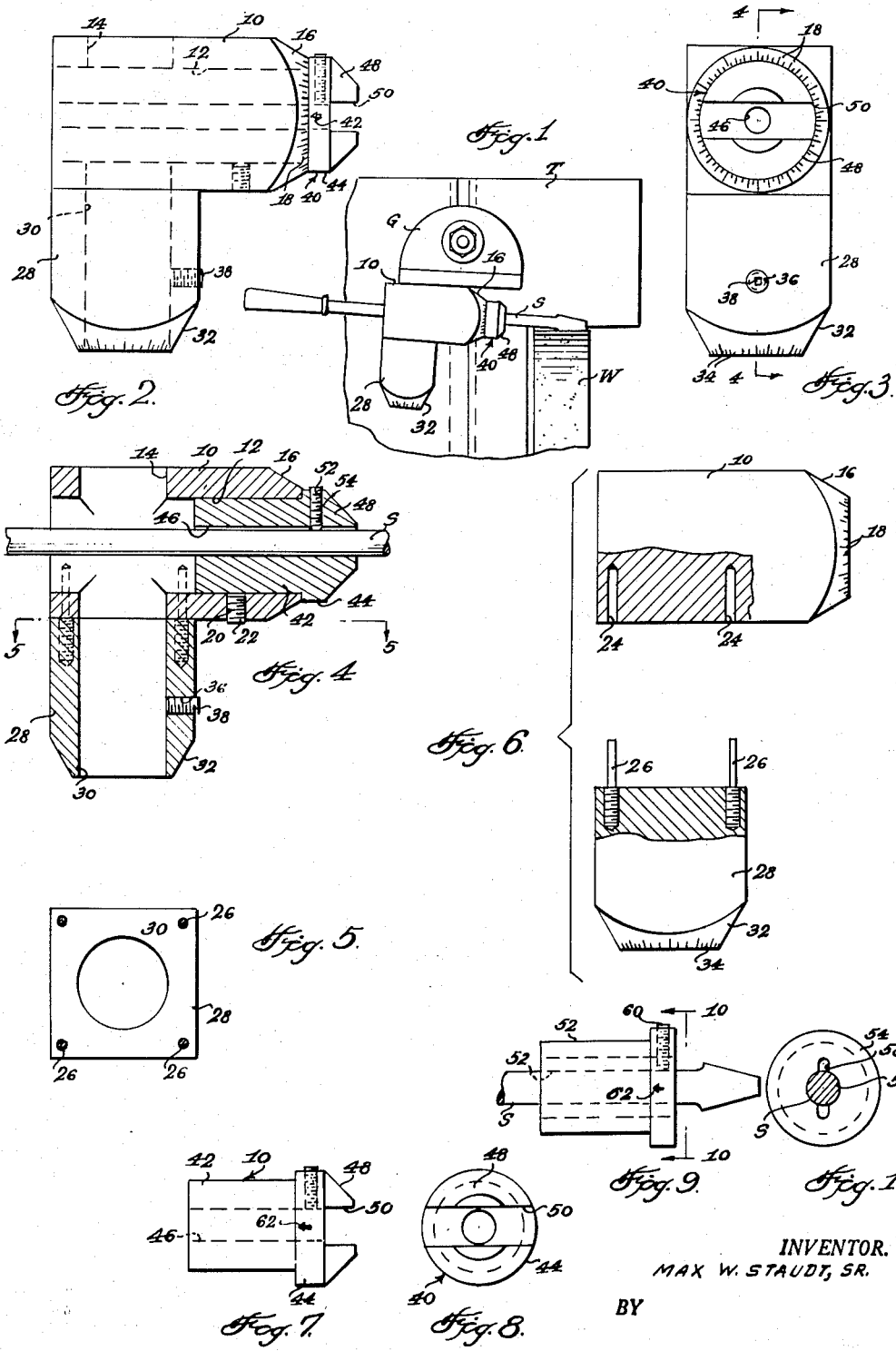
INVENTOR.
MAX W. STAUDT, SR.
BY
McMorrow, Berman & Davidson
ATTORNEYS United States Patent Office 2,733,559
Patented Feb. 7, 1956

2,733,559
WORK HOLDING JIG

Max W. Staudt, Sr., Orange, Tex.

Application July 31, 1953, Serial No. 371,483

1 Claim. (Cl. 51—217)

This invention relates to an improved work holding jig for holding work in a predetermined position while moving it across a grinding wheel.

The primary object of this invention is to support work, such as a screw driver in such a position that the work may be moved across a grinding wheel along a definite path established by the guide carried by the grinding wheel table.

Another object is to enable the work to be held along either of two perpendicular axes and in different angular positions about said axes.

The above and other objects may be attained by employing this invention which embodies among its features a transversely rectangular block having a bore extending longitudinally therethrough, a work holding collet mounted in the bore for rotation therein about the longitudinal axis thereof, a set screw threadedly engaged with the block for impingement on the collet for holding the collet in the selected position of adjustment about the aforesaid axis and a set screw extending radially into the collet for impingement on the shank of a tool extending through the collet.

Other features include a second block having a longitudinal bore extending therethrough which is adapted to register with a transverse bore extending through the first mentioned block and intersecting the longitudinal bore therein, said first mentioned block having openings extending thereinto through one face thereof in parallel relation to the transverse bore, dowel pins carried by the second block and extending longitudinally from one end thereof for entrance into the openings in the first mentioned block and said second mentioned block having an internally screw-threaded radially disposed passage extending thereinto and communicating with the bore for receiving a set screw by means of which a collet may be mounted in the second mentioned block.

In the drawings:

Figure 1 is a fragmentary plan view of a grinding machine showing this improved jig in place thereon and supporting a tool in grinding relation to the grinding wheel;

Figure 2 is an enlarged plan view of the jig;

Figure 3 is an end view of Figure 2;

Figure 4 is a sectional view taken substantially on the line 4—4 of Figure 3;

Figure 5 is a sectional view taken on the line 5—5 of Figure 4;

Figure 6 is an exploded side view of the first and second blocks;

Figure 7 is a detailed side view of the collet;

Figure 8 is an end view of the collet;

Figure 9 is a side view of a modified form of collet; and

Fig. 10 is a sectional view taken on the line 10—10 of Figure 9.

Referring to the drawings in detail, the figure illustrated in Figures 1 to 8 comprises a main block 10 having a longitudinal bore 12 extending therethrough and a transverse bore 14 extending therethrough along an axis which intersects the axis of the longitudinal bore 12. The end of the block 10 remote from the transverse bore 14 is tapered as at 16 to form a conical surface upon which are carried indices 18 defining degrees and minutes around the axis of the bore 12. As shown, the block 10 is square in cross section and extending through one flat face of said block and communicating with the bore 12 is an internally screw-threaded opening 20 in which is threadedly engaged a set screw 22. The block 10 is provided with recesses or openings 24 which open through the face of the block through which the set screw 22 extends and which are symmetrically disposed about the bore 14.

Detachably connected as by dowel pins 26 to the main block 10 is a second block 28 which is square in cross section and of the same dimensions as the block 10, and formed in the block 28 is a longitudinal bore 30 which, when the pins 26 are entered into the openings 24, aligns and registers with the bore 14 in the block 10. The end of the block 28 remote from that carrying the pins 26 is tapered to provide a conical surface 32 carrying indices 34 representing degrees and minutes of a circle. Extending through the block 28 and communicating with the bore 30 is an internally screw-threaded opening 36 for the reception of a set screw 38 by means of which a collet is secured in the block 28.

In the preferred form of the invention a collet, designated generally 40, comprising a circular cylindrical body 42 and carrying an outstanding annular flange 44 adjacent one end, has an external diameter substantially equal to the diameter of the bore 12 or the bore 30 so as to enable the collet to be fitted into a block 10 or 28, as suggested in the drawings. The body 42 of the collet is provided with an internal bore 46 and carried by the body 42 on the side of the flange remote therefrom is a conical extension 48, and extending transversely through the conical extension 48 is a slot 50, to accommodate an angled piece, such as a blade of an offset screw driver. Formed in the collet 40 and extending radially inwardly through the flange 44 is an internally screw-threaded opening 52 which communicates with the bore 46 and threadedly receives a set screw 54 by means of which the shank S of a tool may be clamped in the collet.

In the modified form of the collet, illustrated in Figure 9, the body 52 of circular cylindrical formation is provided with an annular outstanding flange 54 and an axial bore 56 having laterally extending grooves 58 communicating therewith at diametrically opposite points, the grooves 58 serving to accommodate the blade of such as a screw driver, which is usually wider than its shank which is accommodated in the bore 56. A suitable set screw 60 is threadedly engaged with an internally screw-threaded opening formed in the flange 54 and impinges on the shank S of the work held in the collet.

Both the collet 40 and the collet 52 are provided with an index mark 62 which is adapted to cooperate with the indices 18 or 34 on the blocks 10 or 28.

In use, the implement to be ground is mounted in a collet 40 or 52 substantially, as illustrated in the drawings with one or the other of the set screws 54 or 60 impinging on the shank S of the tool to secure the tool in the collet. The collet is then placed in the block 10, or block 28 substantially, as illustrated in Figure 2, and with the flange 44 abutting the body so as to bring the index 62 into a position to cooperate with the indices 18 or 34 and upon adjusting the collet about the axis of the bore 12 or 30, as the case may be, to a selected angle and securing it by tightening the set screw 22 or 38, the jig is then ready to be placed on the table T of a grinder against the guide G of said grinder so as to bring the blade of the tool into the proper position against the grinding wheel W of the grinder. By thus moving the jig across the face of the guide G, it will be obvious that the tool may be moved across the grinding wheel at a selected angle.

An important feature of the described device of the invention is the flat parallel sides of the blocks and the degree adjustments provided by the collets. In the case of regrinding a screw driver, an adapter or collet, such as shown in Figure 9, of the proper size is selected, the screw driver tightened in place, the device put on the table of a grinder, the blade lined up with the grinding wheel, and the device tightened in the grinder fixture, whereas the device is ready for the grinding operation.

The flat parallel sides of the device resting upon the grinder table make it possible to grind a true flat on anything just by turning the device over on the table, and this may be done as many times as necessary or desirable, and the device can be removed from the table to check the work and returned thereto with any checking or resetting.

In grinding such as lathe tool bits, superior facility and results are obtained by using the two blocks 10 and 28 assembled together. This provides two flat sides of relatively wide area and bearing to rest upon the grinder table and this assembly can be reversed. Either of the flat sides can be rested or supported against a mitre gauge on the table, thereby providing a definite angle that can be duplicated time and again until any of the adjustments are reset.

With the collet in place in a block it is possible to grind any number of bits at the same angle just by replacing the bits in the collet, simply by loosening and retightening the set screw holding a bit. In doing this none of the other settings for the angle need be disturbed; and notwithstanding this, the device can be removed from the table, handled, and replaced upon the table at will.

The detachable block 28 can be used separately when desired and it will accommodate shorter tools, such as screw drivers and other hand tools, than the block 10. Since the bores of both blocks open through opposite ends thereof, tools longer than the blocks and those having handles larger in diameter than the shanks or bits to be ground can be accommodated in the bores of the blocks.

While in the foregoing there has been shown and described the preferred embodiments of this invention, it is to be understood that minor changes in the details of construction, combination and arrangement of parts may be resorted to without departing from the spirit and scope of the invention as claimed.

What is claimed is:

In a work holding jig, a rectangular cross section block having a first end and a second end and flat parallel sides, a bore extending through said block and opening through said ends, said bore being parallel with said sides, said first end of the block having a circular scale thereon, a collet having a cylindrical body portion rotatably engaged in said bore and said first end of the block and an enlarged annular portion engaged with said first end of the block, a pointer on said enlarged portion of the collet related to said scale, first means acting between said block and said collet for holding said collet in a selected position of rotation of its pointer relative to said scale, said collet having an axial bore extending therethrough for accommodating a workpiece, and second means on said collet for engaging and holding a workpiece therein, said block having a transverse bore extending therethrough and intersecting the first mentioned bore, another rectangular cross section block of the same cross section as the first mentioned block, said other block having flat parallel sides, said other block having a longitudinal bore and an end, and means securing said other block to the first mentioned block with said end engaged with a side of the first mentioned block with the longitudinal bore aligned with said transverse bore, sides of the blocks being in the same planes.

References Cited in the file of this patent

UNITED STATES PATENTS

| | | |
|---|---|---|
| 1,030,107 | McCormick | June 18, 1912 |
| 1,807,999 | McMurty | June 2, 1931 |
| 1,908,155 | Jorgensen | May 9, 1933 |
| 2,539,289 | Vavrin | Jan. 23, 1951 |
| 2,595,950 | Keebler | May 6, 1952 |
| 2,626,491 | Penkoff et al. | Jan. 27, 1953 |